United States Patent [19]

McGeary

[11] Patent Number: 4,949,192
[45] Date of Patent: Aug. 14, 1990

[54] MAGNETIC CARD TRANSDUCING SYSTEM

[75] Inventor: Thomas C. McGeary, Palos Verdes Estates, Calif.

[73] Assignee: Mag-Tek, Inc., Carson, Calif.

[21] Appl. No.: 11,651

[22] Filed: Feb. 5, 1987

Related U.S. Application Data

[63] Continuation of Ser. No. 695,774, Jan. 28, 1985, abandoned.

[51] Int. Cl.⁵ .................................................. G11B 5/09
[52] U.S. Cl. ......................................... 360/2; 235/493
[58] Field of Search ........................ 360/2, 53, 77, 121, 360/76; 235/449, 450, 431, 482, 493

[56] References Cited

U.S. PATENT DOCUMENTS

| | | | |
|---|---|---|---|
| 3,869,721 | 3/1975 | Korda | 360/53 |
| 4,058,839 | 11/1977 | Darjany | 360/2 |
| 4,585,929 | 4/1986 | Brown | 235/482 |

*Primary Examiner*—Vincent P. Canney
*Attorney, Agent, or Firm*—Nilsson, Robbins, Dalgarn, Berliner, Carson & Wurst

[57] ABSTRACT

A system for use with a mag-stripe card for transducing signals and performing predetermined transaction processing to record fresh data on the card. A closed-end slot is defined for guiding the card in manual motion. Offset record (broad path) and read (narrow path) transducers are mounted in a relationship to afford increased tolerances. Optical sensors manifest card positions as data for a processor to control and sequence proper operation. The processor also receives confirmatory read signals to verify proper recording on a card.

9 Claims, 3 Drawing Sheets

MAGNETIC CARD TRANSDUCING SYSTEM

This is a continuation of application Ser. No. 695,774, filed Jan. 28, 1985, now abandoned.

BACKGROUND AND SUMMARY OF THE INVENTION

Various forms of plastic identification cards bearing a stripe of magnetic medium have come into widespread use. Although many systems for use with such cards include apparatus to drive the card in relation to transducer apparatus, other systems require manual movement of the card in relation to the transducers. One such manual system is shown and described in U.S. Pat. No. 3,914,789, entitled "Mannually Operated Magnetic Card Encoder" and granted Oct. 21, 1975.

Generally, prior manually operated card systems have a slot with open ends to guide the card as it is moved across magnetic transducers. In such structures, both sensing and recording transducers have been used. Generally, the successful operation of such apparatus necessitates smooth aligned motion of the card. However, unfortunately the manual motion of the card is sometimes erratic to the extent that the transducers malfunction. For example, in some instances the card is moved to the extent that the recording apparatus operates in an improper track and accordingly can render the card inoperative for future use. Consequently, a need exists for an improved apparatus to control the manual movement of magnetic stripe cards along a predetermined path in more consistent motion patterns.

Some systems relying on manual motion for magnetic transducers involve repeated passes of the card over the transducers. For example, during an initial pass, the stripe might be sensed for certain information. After the information is provided to the system, another pass may involve recording fresh data on the card. Traditionally, such apparatus operates during multiple passes of the card through an open-ended slot. Such multiple passes increase the possibilities for an erratic motion patterns. Again, for such systems a need exists to improve a manually operated card transducer which effectively steers and controls the card.

The present invention is based on recognizing a desirable guide structure for manually moving a magnetic stripe card in relation to transducers and providing the associated controls. Specifically, structure of the system defines a closed-end slot for guiding a magnetic card and attaining more consistent motion patterns in relation to an offset transducer arrangement. The system also incorporates structure for sensing fresh recorded data for verifying that cards have been correctly recorded. Thus, the system involves interrelated structures for guiding a card, sensing its position to correlate operations, and reading a card as recorded with an offset to confirm proper recording of the card.

DESCRIPTIONS OF THE DRAWINGS

In the drawings, which constitute a part of this specification, exemplary embodiments demonstrating various objectives and features hereof are set forth as follows:

FIG. 1 is a perspective view of an apparatus constructed in accordance with and incorporating the present invention illustrated along with a magnetic stripe card;

FIG. 2/ is a perspective and diagrammatic view illustrating the mechanism of the apparatus of FIG. 1;

DESCRIPTION OF THE ILLUSTRATIVE EMBODIMENT

As indicated above, a detailed illustrative embodiment is disclosed herein. However, systems for accomplishing the objectives of the present invention may be detailed quite differently from the disclosed embodiment. Consequently, specific structural and functional details disclosed herein are merely representative; yet, in that regard, they are deemed to afford the best embodiment for purposes of disclosure and to provide a basis for the claims herein which define the scope of the present invention.

Figure 1:
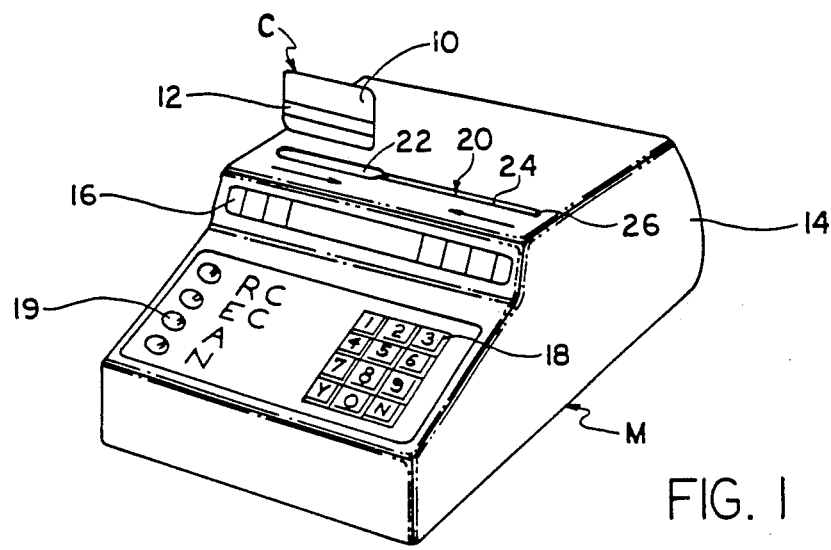
Figure 4:
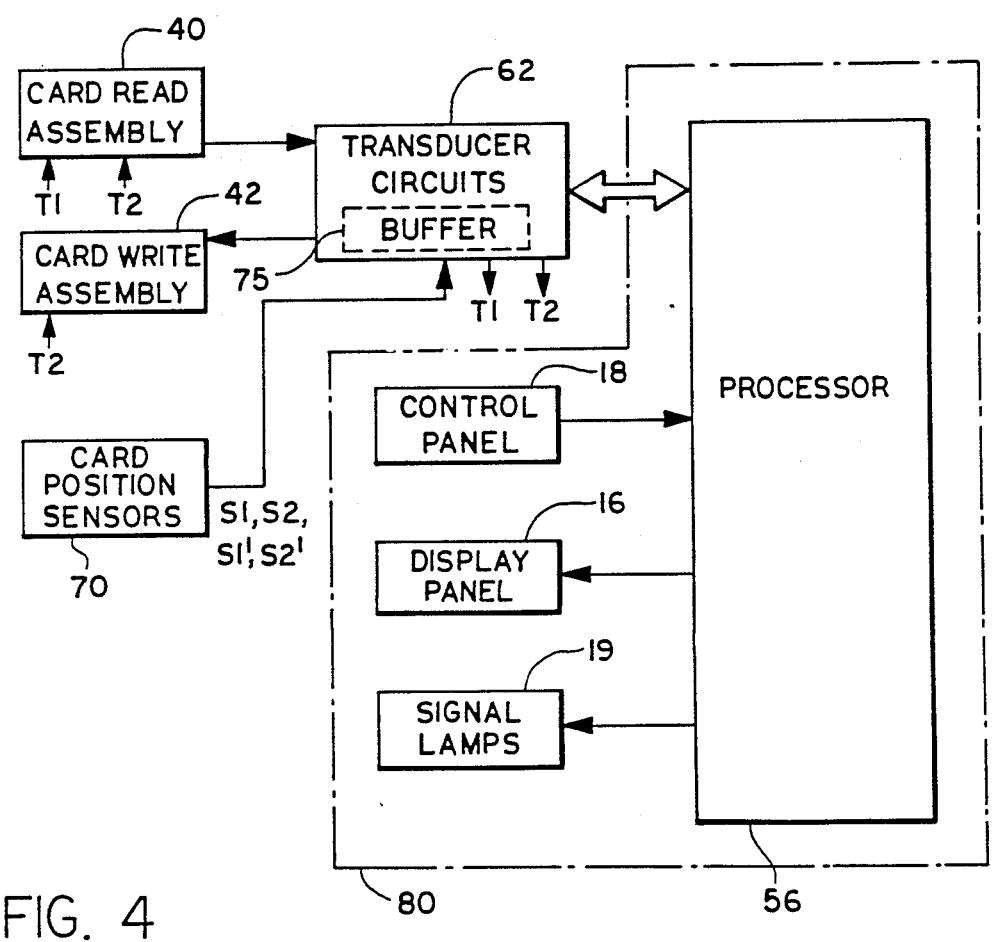
FIG. 4 is a block diagram illustrative of the electrical system incorporated in the apparatus of FIG. 1.
Figure 2:
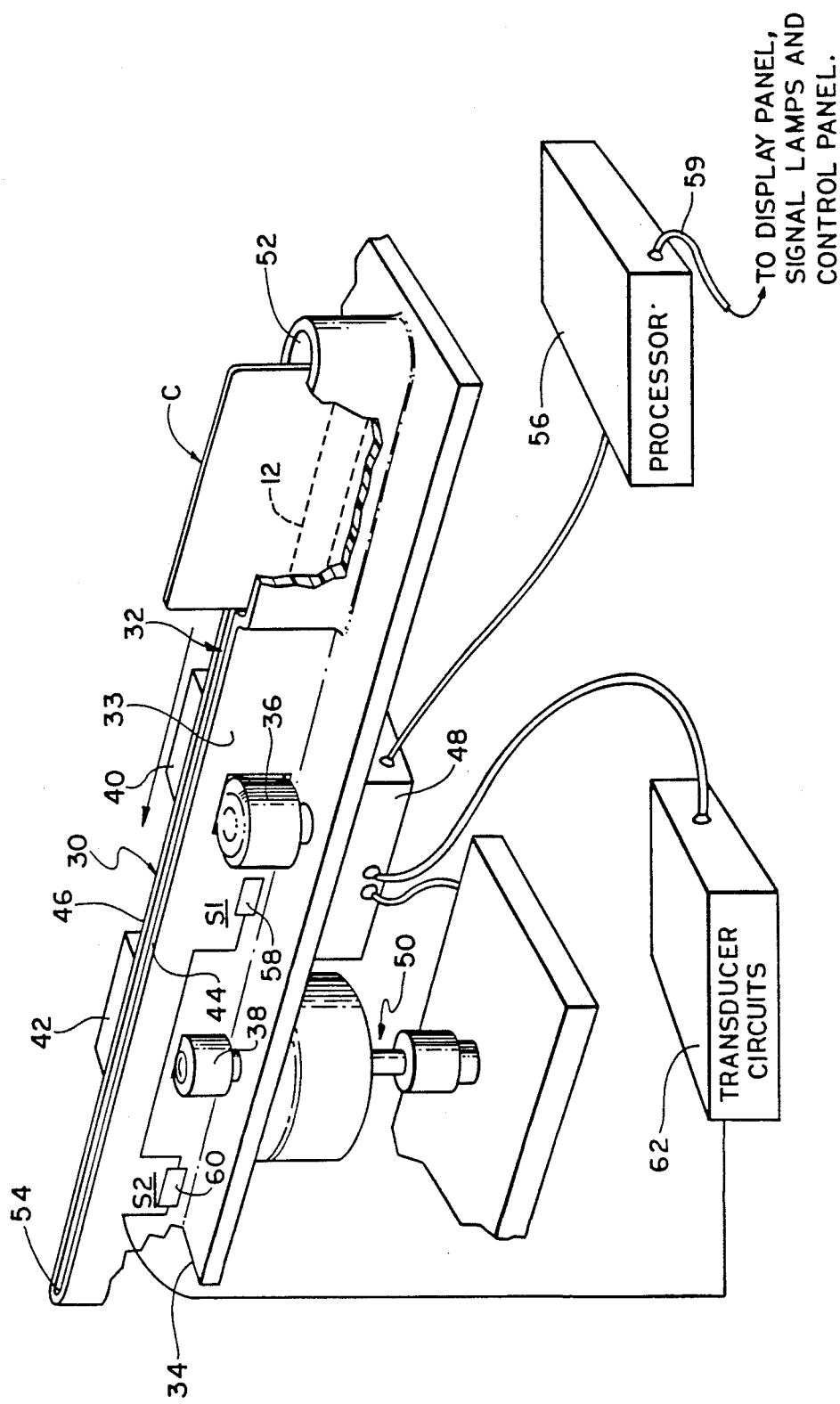

Referring initially to FIG. 1, a card machine M is illustrated for use in cooperation with a magnetic stripe card C. The machine M incorporates a mechanism as illustrated in FIG. 2 and the electronics as illustrated in FIG. 4 to embody the invention hereof. The machine may be specifically designed for a variety of predetermined operations relating to the use of magnetic card C. Exemplary operations include initial card preparation as well as various transaction operations as described below.

The magnetic stripe card C may be of a conventional form, several of which are currently in widespread use, and which essentially consist of a plastic sheet 10 supporting a magnetic stripe 12. A specific form of the Card C is shown in greater detail in FIG. 3 which will be referred to in explaining the transducer format. In one well known application, such cards are used in a customer-teller situation to expedite financial transactions.

The machine M incorporates a housing 14 which exposes a display panel 16, a control panel 18, and signal lamps 19. A slot 20 extends horizontally across the top of the housing 14, for receiving a mag-stripe card C illustrated above it.

In use, a card C is placed in the slot 20 at an enlarged section 22 (left) for an initial movement in a stroke to the right. Note that the slot 20 is substantially larger than twice the length of the card C.

Transducers are mounted in the housing 14 to communicate with the magnetic stripe 12 of a card C as it is moved in an initial stroke from the wide section 22 to the right along the narrow slot length 24. It is to be noted that the slot length 24 is closed at an end 26 defining the termination of the card path. After reaching such a position, a card may be moved to the left in a return stroke back to the wider slot section 22 and withdrawn.

Various implementations will dictate various operations in the course of the two strokes, as disclosed below. However, generally data is sensed from the stripe 12 in the forward stroke, processed and fresh data is recorded during the return stroke.

The magnetic stripe 12 carries multiple record tracks. One or more of the tracks may be fixed for the life of the card while other tracks are altered with use of the card. Alternative arrangements have also been proposed as where all tracks are modified with each use of the card. Consider an illustrative sequence in which a card C first is placed in the wide section 22 of the slot 20, then moved manually in a forward or initial stroke along the defined horizontal path of the slot 20 to the terminal position at the end 26. Data sensed during that operation may be processed to include a display on the panel 16.

With the card C remaining in the machine M, the control panel 18 may then be used to enter data related to a transaction. The card C is then manually moved through a return stroke (FIG. 1, leftward path) back to the section 22. During that stroke, the machine M records fresh data in the stripe 12, then reads the data for verification. If the freshly recorded data is correct the operation may be terminated. Alternatively, incorrect recording will command a repeat operation.

At this point in the description it will be helpful to consider some of the actions that will improperly affect recording a card C. First, moving a card C in the initial stroke (right as illustrated) may be performed in such a sloppy manner that no worthwhile data is sensed. Such operation is easily sensed to command a repeat operation.

A particularly troublesome manipulation involves moving a card improperly during the return or recording stroke (leftward). For example, in the motion pattern, the card is lifted from the slot 20 to a sufficient extent that recording is displaced from the desired track of the stripe 20 to an undesired track. Such a motion pattern can leave the card recorded with false data to the extent that it is useless.

Another problem involves withdrawal (accidental or otherwise) of the card C from the slot 20 at the end of the first stroke (adjacent the end 26) and the possible insertion of a different card. Normally such operations are performed by a teller as he is watched by a customer who is the assigned card holder. Consequently, while various manipulations are possible, the only operation likely to escape the customer would involve simply switching cards after the initial stroke which could be accidental or deliberate.

The system of the present invention affords control and guidance with regard to these problems. Accordingly, controls and guide means are provided to accomplish relatively consistent manual motion of a card. Specifically in that regard, it has been determined that for manual motion patterns greater than twice the length of the card the closed-end slot 20 (end 26) tends to produce far more consistent motion patterns. Other control and guide functions are provided as disclosed below in the operating structure of the system.

Considering the machine M in somewhat greater detail, reference will now be made to FIG. 2 depicting the electromechanical components. Note, however, that the view of FIG. 2 is from a direction opposed to that of FIG. 1 in that the wide section of the slot is at the right.

Immediately below (and in alignment with) the slot 20 (FIG. 1) a body 30 (FIG. 2) defines a card slot 32 extending horizontally and integrally supported on a platform 34. The body 30 and platform 34 are mounted on a frame (not shown) under the housing 14 so that the slots 20 and 32 align.

As illustrated in FIG. 2, a pair of lateral openings are defined in the wall 33 of the slot 32 which are penetrated by rollers 36 and 38. Specifically, the roller 36 faces (across the slot 32) a read head assembly 40 while the roller 38 faces a write head assembly 42. The assemblies 40 and 42 incorporate transducer heads for communication with the magnetic stripe 12 of a card C as will be discussed below with reference to FIG. 3. At present, it is to be understood that as a card C is moved along the path defined by the open-top slot 32 (between rails 44 and 46) magnetic transducing operations are performed by head assemblies 40 and 42 operating in association with circuitry contained in a housing 48 to sense or record electrical signals.

While the roller 36 is essentially an idler, the roller 38 is connected to a pulse generator 50, for supplying pulses to synchronize the recording operations of the write head assembly 42. Such pulse generators are well known in the prior art, one form of which is disclosed in the above-referenced U.S. Pat. No. 3,914,789.

Again, note that the apparatus of FIG. 2 is viewed from the rear, as related to the view of the external structure depicted in FIG. 4. A card C (FIG. 2) is initially received in the slot 32 at a wide section 52. During an initial stroke, the card is manually moved along the path defined by the slot 32 to a terminal position at the end 54. In the initial stroke, the magnetic stripe 12 of a card C is sensed by the read head assembly 40. The size and disposition of individual heads in the assemblies 40 and 42 are treated below with reference to FIG. 3.

Signals sensed by the head assembly 40 are communicated through electronics in the housing 48. In an orderly arrangement, such signals are provided from the electronics 48 to a processor 56 described in greater detail below. Note that the processor 56 is connected through a cable 59 to other terminal components as illustrated in FIG. 4, specifically the display panel 16, the control panel 18, and the signal lamps 19.

After the initial stroke, card C is moved through a return stroke during which the unit head assembly 42 records signals. Such signals are verified, as recorded, after being sensed by the read head assembly 40.

In the course of the initial and return strokes, the system monitors the presence and position of a card C in the slot 32. The monitoring involves a pair of optical devices or photosensors 58 and 60. Specifically, the photosensors 58 and 60 respond to the presence of the card C at locations S1 and S2 in the slot 32 to provide a pair of binary signals S1 and S2 respectively. Thus the photosensor 58 provides the signal S1 high when the card is at the card position S1. Similarly, the photosensor 60 provides the signal S2 high when a card is at the S2 position. Accordingly, the binary signals S1 and S2 are supplied to the transducer circuit 62 to be expanded to include the conventional negation forms. Thus, the signals S1, 'S1, S2, and 'S2 are available. High values of the negation signals ('S1 and 'S2) manifest the absence of a card respectively at the designated locations.

The binary signals S1, S2, 'S1, and 'S2 are utilized to properly sequence operations with card C. That is, the signals S1, S2, 'S1, and 'S2 establish a time sequence for the interpretation of sensed signals to accommodate bidirectional motion of a card C and to some extent to control use of a card. In that regard, note that the transducer circuit 62 is connected to the electronics in the housing 48 which, as indicated, is in turn connected to the processor 56.

In manually moving a card C through the reciprocal motion, the photosensors 58 and 60 provide signals in accordance with the following table.

| Signals | Card Position |
| --- | --- |
| 'S1 'S2 | Rest position (not at S1 or S2) |

| Signals | Card Position |
| --- | --- |
| S1 'S2 | First position (at S1, not S2) |
| 'S1 S2 | Second position (at S2, not S1) |
| S1 'S2 | (First position (at S1, not S2) |
| 'S1 'S2 | Rest position (not at S1 or S2) |

These conditions are employed to sequence the operation of the system. That is, the transducer circuits 2 incorporate logic to indicate and control the operation sequence. Specifically, if a card C is not moved to accomplish the above sequence, the operation will be halted. For example, withdrawing a card at the terminal position after the initial stroke aborts the sequence.

The position signals S1, S2, 'S1 and 'S2 also provide timing signals for the transducer operations. A binary timing signal T1 is provided high during the initial stroke and a similar signal T2 is high during a proper return stroke. The generation of such signals with logic networks is well known. Accordingly, 'S1+ 'S2+clear state=T1. Similarly, 'S1+S2+ proper sequence=T2.

While the sensors 58 and 60 (FIG. 2) simply sense the presence of a card at specific locations, the configuration of the transducer head assemblies 4 and 42 requires some further detailed explanation. The somewhat critically disposed head configurations accommodate a degree of tolerance to improper manual movement of the card. Accordingly, if card recording and sensing is not within such tolerance, the operator is so informed and the recording operation is to be repeated.

Figure 3:
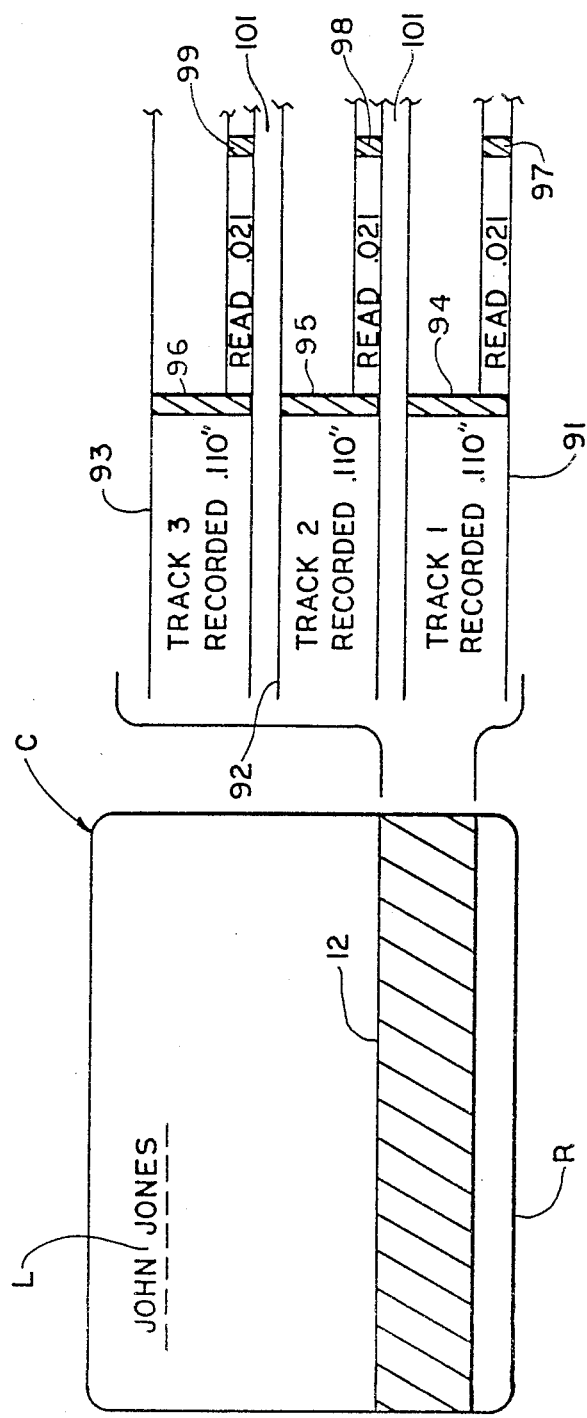
FIG. 3 is a diagrammatic view illustrating the compensating recording format on a magnetic stripe card in accordance herewith, and the attendant structure.

Referring to FIG. 3, a card C is shown in enlarged scale. It carries an embossed legend L in the upper area. The bottom edge R of the card C as depicted is sometimes called the reference edge because it contacts a guide surface during transducing operations.

Just offset from the reference edge R, a magnetic stripe 12 extends across the full width of the card C. The recording format of the system hereof is significant in relation to the stripe 12.

In FIG. 3, the stripe 12 is expanded to enable a representation of three recording tracks conventionally designated 1, 2 and 3. Specifically, tracks 91, 92 and 93 are shown. In an operating embodiment, the tracks are each recorded to a width of 0.110 inches. That is, in the unit assembly 42 (FIG. 2) a set of write heads 94, 95 and 96 (FIG. 3) have an effective widths as illustrated, e.g. 0.110 inches. The spacing between the heads 94, 95 and 96 provide guard band spaces 101 between the tracks 91, 92 and 93, e.g. 0.020 or 0.030 inches.

With respect to the read assembly 40 (FIG. 2), a set of transducer heads are included as represented by the heads 97, 98 and 99 (FIG. 3). These read heads occupy substantially less than half the recorded track width, e.g. 0.021 inches as illustrated.

In transducing operations, the reference edge R should contact a guide surface (bottom of slot 32 (FIG. 2). Transducing operations are fouled when motion is sloppy and the reference edge R is lifted from its guide surface as during recording. However, such operations are common with the result that the record is fouled. For example, the track 1 may be partly or entirely missed as the card C is lifted displacing the tracks upward with reference to the heads 94, 95, 96, 97, 98, and 99 as illustrated in FIG. 3.

An important consideration involves assuring that the recording is properly aligned in each of the tracks. The read heads 97, 98, and 99 sense the records to confirm proper recording data; however, by reason of their offset, these heads also sense the tracks to assure the requisite alignment of data recorded in the tracks. Consider an exemplary operation.

If a card C is accidently raised during the record operation, the tracks 1, 2, and 3 respectively are raised with reference to both the recording heads 94, 95, and 96, and the read heads 97, 98, and 99. The displacement with respect to the recording heads will produce a defective record that may render the card unusable. Consequently, it is important to detect such an occurrence.

If a card C is lifted or raised during the recording stroke, the read heads 97, 98, and 99 are effectively displaced with reference to the tracks. Furthermore, in view of the reduced size of the heads 97, 98, and 99, as well as their offset, they are likely to miss the misaligned data record. Specifically, if a card C is raised by substantially twenty thousandths of an inch, the head 97 operates below the track 1 and the heads 98 and 99 operate in the guard band spaces. Consequently, fouled or garbled data is produced and the need for a repeat operation is manifest. The operator is therefore notified to repeat the operation so that the data (held in the transducer circuits 62, FIG. 4) can be properly recorded on the card in proper alignment with the tracks.

Turning now to the system operation with reference to FIG. 4, the card read assembly 40 and the card write assembly 42 are depicted in block form along with the transducer circuits 62. The photosensors 58 and 60 (FIG. 2) are represented electrically by a block designated card position sensors 70. Other elements of FIG. 4 are block representations of the processor 56, the control panel 18, the display panel 16, and signal lamps 19.

The transducer circuits 62 incorporate a buffer register 75 essentially to receive signals (either from a recording operation or for a recording operation) and deliver them in a consistent sequence appropriate to the stroke direction of the card as indicated by the timing signals T1 and T2. Various structures for cycling binary signals from a buffer register in either direction to accommodate directional sensing and recording are well known and widely used in the prior art.

The processor 56 may take various computer forms depending on the nature of the specific transactions. However, one satisfactory form for the processor 56, along with the control panel 18, the display panel 16, and the signal lamps 19 is available as an integral structure 80 from Mag-Tek, Inc. of Carson, Calif., forms of which are specifically identified as the MT-50 and the MT-60.

A complete understanding of the composite system may now best be accomplished by an explanation of an exemplary sequence of operations involving reference somewhat concurrently to all of the drawings.

Assume a card C as presented by an assigned holder, to support a financial transaction. Furthermore, assume that an operator, as a bank teller, performs the operations, possibly with assistance from the assigned card holder. Finally, assume that the sequence of operations involves an initial stroke to sense the magnetic stripe and a return stroke to record fresh information.

In accordance with aspects hereof, the operations are accomplished with certain control features. Specifically, the position signals S1, S2, S1' and S2' monitor the sequence to properly interpret card movements. The closed-end slot 20 (FIG. 1) facilitates improved manual motion patterns. After freshly recording on card C, the recording is confirmed as correct to signify approval. Finally, the physical relationship of the individual transducer heads to the track 12, increases the tolerance of the system to irregular motion patterns.

In the exemplary operation, a card C is inserted into the slot 20 of the housing 14 (FIG. 1) to be positioned as illustrated in the slot section 52 of FIG. 2. In that position, the teller (or operator) may actuate the keyboard control panel 18 to command a transaction operation. With such a command, the processor 56 (FIG. 4) may signal the lamps 19, specifically illuminating the designation RC commanding the operation to read the card. The timing signal T1 then becomes high.

As the teller moves the card C through the initial stroke (left to right in FIG. 1; right to left in FIG. 2) data is read from the card C by the read assembly 40 (FIGS. 2 and 4). The resultant signals are processed by the transducer circuit 62 and supplied to the processor 56. Signals may then be supplied from the processor 56 to the display panel 16 (FIG. 1). If the card was not read to provide intelligent data, the operation will be aborted indicating the initial stroke should be repeated. A designation N may indicate the event at the signal lights 19 with a brief flashing.

With a successful initial operation, the teller may check the display 16 before continuing or he may actuate the control panel 18. The action will depend on the application of the system and the nature of the transaction.

Note that while the teller checks the display 16 or uses the panel 18 the card C is permitted to remain in the slot 20 (FIG. 1) at the terminal position of the initial stroke, i.e. adjacent the end 26 of the housing 14. Should the card C be withdrawn from that position, the card position signals would indicate a change out of sequence from the second position ('S1, S2) to rest position ('S1, 'S2) without the intermediate occurrence of the first position (S1, 'S2). Such a change from the predetermined sequence pattern would be detected by the transducer circuits 62 (FIG. 4) to terminate the operation in process and indicate such occurrence on the lamps 19.

With the card C in position at the end of the initial stroke, the control panel 18 is actuated to communicate with the processor 56 and thereby form signals representative of the transaction and to be freshly recorded on the magnetic stripe 12.

The signals to be recorded on the stripe 12 are supplied from the processor 56 to the transducer circuits 62 for registration in the buffer 75. Accordingly, the transducer circuits set up the system for the recording operation by providing the timing signal T2 high and illuminating an RC in the lamps 19. At that point, the card C is moved through a return stroke back to its initial position. In that motion, the card is freshly recorded by the write assembly 42, and such recording is verified by the read assembly 40 sensing the data for comparison with the desired recording data. Note that if the card C is lifted during the record stroke, the critically-offset, smaller read heads 97, 98, and 99 (FIG. 3) normally will sense a faulty recording and a repeat operation will be advised so that the data in storage can be effectively recorded.

Considering the record-verify operations in sequence, as the card C passes the write assembly 42 (FIG. 2) the buffer 75 unloads to record fresh data on the stripe 12. In the same return stroke, with the timing signal T2 high, the card moves past the read assembly 40. The freshly recorded data is sensed from the stripe 12 and returned to the buffer for comparison with data held temporarily in the processor 56. If the comparison is true, the operation is concluded. If not, a negative operation is manifest by the designation N at the signal lamps 19. Consequently the buffer 75 is re-loaded and the card is re-inserted for repeat strokes. During the initial stroke, the signal T1 is not provided and accordingly the card C is not sensed. Of course, the original data from the card has been used by the processor 56. During the return stroke, the record-verify operation is again performed with the signal T2 high. Likely, greater care will be taken in moving the card C during the second attempt and the fresh data will be properly recorded.

Thus substantial guidance and control are provided for manual operation. The operation will abort if the initial reading is faulty or if the sequence is not proper, as if the card is withdrawn after the initial stroke. If the first steps are proper but the return stroke does not accomplish a valid recording, the data to be recorded is again drawn from the processor and an instruction is given by the panel 16 or lamps 19 to repeat the operation.

From the above explanation it may be seen that the system of the present invention may be readily incorporated in various embodiments to accomplish a variety of operations. In that regard, a number of specific operations are well known which involve multiple passes or strokes of a card in relation to the transducer apparatus. Furthermore, it is deemed likely that additional specific operations are well known which involve multiple passes or strokes of a card in relation to the transducer apparatus. Furthermore, it is deemed likely that additional specific operations will come into widespread use in view of the reliability afforded by incorporating the system of the present invention.

Of course, various alternative techniques may also be employed departing from those disclosed and suggested herein; consequently, it is to be understood that the scope hereof should be determined in accordance with the claims as set forth below.

What is claimed is:

1. An apparatus for use with a card bearing an elongate stripe of magnetic medium, for operation to sense and record said card in sequence as it is moved manually after being placed in the apparatus, comprising:

housing means defining a closed-end slot, open along its length and larger than twice the length of said card for receiving a portion of said card bearing said stripe and guiding said card for manual motion between end positions in said slot by manual contact on said card;

transducer means including at least one read head and at least one write head, said heads being fixed in said housing means contiguous to said slot for transducing signals with respect to said elongate magnetic stripe as said card is manually moved in said slot;

a plurality of position sensors fixed in said housing means to sense the presence of said card at particular locations;

means for processing signals for said transducer means in accordance with a predetermined transaction whereby to sense and record said magnetic medium; and sequencing means connected to be controlled by said position sensors to sequence the operation of said read head and said write head.

2. An apparatus according to claim 1 wherein said read head is of lesser width than said write head with respect to said stripe.

3. An apparatus according to claim 2 wherein said read head is offset from alignment with said record head.

4. An apparatus according to claim 3 wherein said record head has an effective track width at least twice that of said read head.

5. An apparatus according to claim 1 wherein said processing means includes means for controlling said transducer means to sense said magnetic medium for verification of recording on said magnetic medium.

6. An apparatus according to claim 5 wherein said transducer means records and senses said card in one single stroke through said open slot means.

7. An apparatus for use with a card bearing an elongate stripe of magnetic medium, for operation with said card as it is moved manually, comprising:

housing means defining a slot open along its length for receiving a portion of said card and guiding said card in said slot with manual contact on said card for magnetic transducing motions;

transducer means fixed in said housing means contiguous to said slot means for transducing signals with respect to said magnetic stripe as said card is manually moved in said slot, said transducer means including at least one read head and at least one record head and wherein said record head records a track substantially wider than the effective width of said read head, and further said read head being offset from alignment with said record head to decrease the tolerance of reading said card while slightly lifted from said open slot during said manual contact; and means for processing signals for said transducer means in accordance with a predetermined transaction whereby to sense and record said magnetic medium.

8. An apparatus according to claim 7 wherein said record head has an effective track width at least twice that of said read head.

9. An apparatus according to claim 7 wherein said processing means includes means for controlling said transducer means to sense said magnetic medium for verification of recording on said magnetic medium.

* * * * *